United States Patent
Hofer

(10) Patent No.: US 10,307,994 B2
(45) Date of Patent: Jun. 4, 2019

(54) COMPOSITE BOARD COMPOSED OF WOOD MATERIAL

(71) Applicant: Swiss Krono Tec AG, Lucerne (CH)

(72) Inventor: Josef Hofer, Horw (CH)

(73) Assignee: Swiss Krono Tec AG, Lucerne (CH)

( * ) Notice: Subject to any disclaimer, the term of this patent is extended or adjusted under 35 U.S.C. 154(b) by 124 days.

(21) Appl. No.: 15/505,129

(22) PCT Filed: Aug. 17, 2015

(86) PCT No.: PCT/EP2015/068821
§ 371 (c)(1),
(2) Date: Feb. 20, 2017

(87) PCT Pub. No.: WO2016/026801
PCT Pub. Date: Feb. 25, 2016

(65) Prior Publication Data
US 2018/0186126 A1   Jul. 5, 2018

(30) Foreign Application Priority Data
Aug. 20, 2014  (EP) .................................. 14181674

(51) Int. Cl.
| | | |
|---|---|---|
| *B32B 21/06* | (2006.01) | |
| *B32B 21/02* | (2006.01) | |
| *B32B 37/18* | (2006.01) | |

(52) U.S. Cl.
CPC .............. *B32B 21/06* (2013.01); *B32B 21/02* (2013.01); *B32B 37/18* (2013.01); *B32B 2260/028* (2013.01); *B32B 2260/046* (2013.01); *B32B 2307/544* (2013.01); *B32B 2307/718* (2013.01); *B32B 2307/734* (2013.01)

(58) Field of Classification Search
CPC ......... B32B 21/06; B32B 21/02; B32B 37/18; B32B 2260/028; B32B 2260/046; B32B 2307/544; B32B 2307/718; B32B 2307/734

USPC ...................................................... 428/537.1
See application file for complete search history.

(56) References Cited

U.S. PATENT DOCUMENTS

| | | |
|---|---|---|
| 5,925,211 A | 7/1999 | Rakauskas |
| 6,451,444 B1 | 9/2002 | Ollila et al. |

FOREIGN PATENT DOCUMENTS

| | | | |
|---|---|---|---|
| CN | 201525061 U | | 7/2010 |
| CN | 102080441 A | | 6/2011 |
| CN | 103785195 A | | 5/2014 |
| DE | 10300247 | * | 7/2004 |
| DE | 10300247 A1 | | 7/2004 |
| DE | 202004017558 | * | 2/2005 |
| DE | 202004017558 U1 | | 2/2005 |
| DE | 102005038734 | * | 2/2007 |
| DE | 102005038734 A1 | | 2/2007 |
| DE | 699 31 251 T2 | | 4/2007 |
| DE | 102006058244 | * | 6/2008 |
| DE | 102006058244 A1 | | 6/2008 |
| EP | 1136636 | * | 9/2001 |
| EP | 1136636 A1 | | 9/2001 |

OTHER PUBLICATIONS

Chinese office action for patent application No. 201580043990A dated Feb. 23, 2018.
Pfleiderer, PremiumBoard MFP Hybrid Brochure, published Oct. 2013.
International search report for application No. PCT/EP2015/068821 dated Nov. 27, 2015.
Chinese office action for patent application No. 201580043990.X dated Sep. 7, 2018.

* cited by examiner

*Primary Examiner* — Leszek B Kiliman
(74) *Attorney, Agent, or Firm* — Bachman & LaPointe, PC

(57) ABSTRACT

A composite board composed of wood material with a middle layer (4) made of chipboard, wherein the middle layer is connected to at least one outer layer (2, 6) composed of fiberboard, wherein an artificial-resin-impregnated paper (3, 5) is arranged between the middle layer and the outer layer.

14 Claims, 1 Drawing Sheet

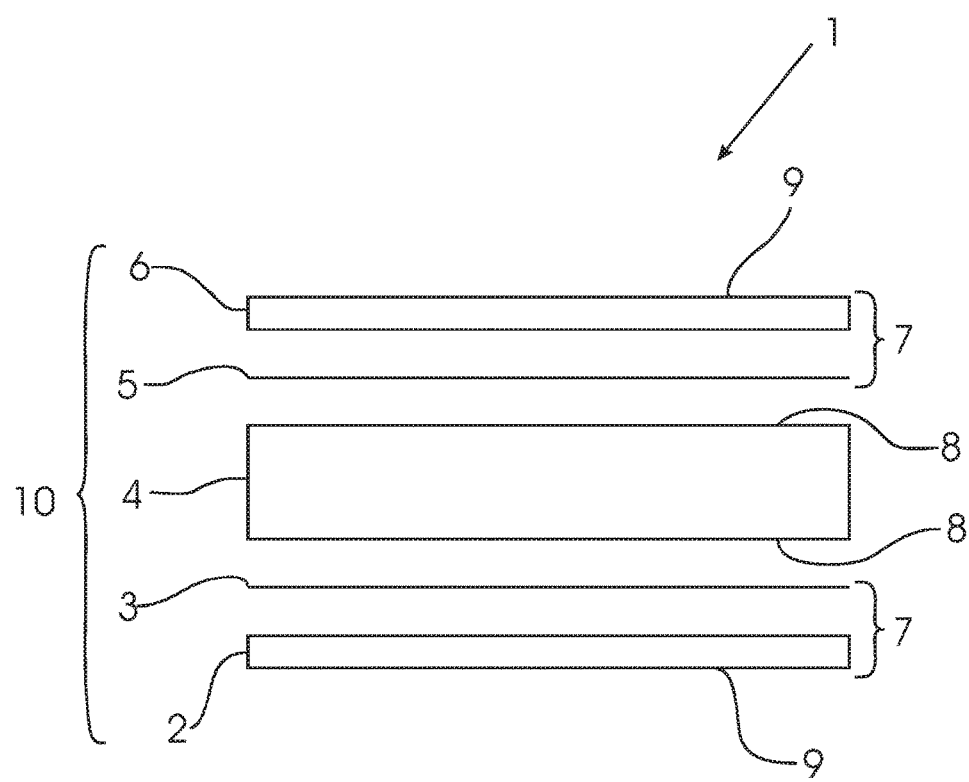

COMPOSITE BOARD COMPOSED OF WOOD MATERIAL

BACKGROUND OF THE INVENTION

The invention relates to a composite board composed of wood material, which has the best possible strength properties. At the same time, the surface of the composite board shall be suitable for applying decorative coatings.

Composite boards composed of wood material, which are suitable for heavy loads and which can be provided with decorative surface coatings, are offered for example as PremiumBoard MFP Hybrid by Pfleiderer (Pfleiderer, PremiumBoard MFP Hybrid Brochure, published October 2013). A comparable board is offered by FINSA under the name superPan. Egger offers the Combiline board. All of these boards are composite boards composed of wood material, which have a middle layer composed of chipboard or OSB board (OSB=Oriented Strand Board). Outer layers composed of fiberboard are glued onto the middle layer, in the case of the Combiline board from Egger, very thin MDF boards (MDF=Medium-Density Fiberboard) are used. In the case of Pfleiderer, the gluing takes place by means of polyvinyl acetate glue. These boards are offered for use as supportive furniture construction boards, shelving, but also for construction purposes, above all for interior work.

These generic composite boards already have usable strength properties for the intended application areas, for example a bending strength of approx. 28 N/mm$^2$, a transverse tensile strength of 0.5 N/mm$^2$ and a peel strength of 0.8 N/mm$^2$ for a 16-mm-thick board with an average bulk density of 830 kg/m$^3$ (Pfleiderer, PremiumBoard MFP Hybrid Brochure, published October 2013). The strength of this known composite board is limited by the forces, which can receive the glued joint between middle layer and outer layer.

However, the production of the generic composite board is complicated because the gluing of the whole surface of the boards is operationally complex and it is technically difficult to ensure an even distribution of the glue over the entire surface of the middle layer or respectively outer layer to be connected. An uneven distribution of the glue leads to a qualitatively poor gluing in some areas. Moreover, the glue used to connect the outer layer with the middle layer introduces considerable amounts of liquid both into the middle layer as well as the outer layer so that a deformation of the middle layer or respectively outer layer during the hardening of the glue must be prevented.

SUMMARY OF THE INVENTION

The object of the invention is thus to suggest an economically producible composite board composed of wood material with good strength properties.

The object is solved with a composite board composed of wood material as disclosed herein as well as a method for producing a composite board composed of wood material also as disclosed herein.

An important characteristic of the invention is that an artificial-resin-impregnated paper is inserted between the middle layer and at least one outer layer. Thus—in contrast to common practice—the artificial-resin-impregnated paper here is not arranged on the outside of a composite board, but in the edge area directly below the outer layer of a composite board according to the invention. The artificial-resin-impregnated paper interconnects the middle layer and the at least one outer layer. A middle layer, which is connected on each of its two surfaces (top side and bottom side of the middle layer) via an artificial-resin-impregnated paper, is preferably connected with an outer layer. The middle layer thereby preferably consists of a single- or multi-layered chipboard or a single- or multi-layered OSB board (oriented strand board; special chipboard made of wide, flat chips). The outer layer is preferably made of medium-density or high-density fiberboard (MDF or HDF).

The artificial-resin-impregnated paper consists of a paper web, usually with the dimensions of the middle layer or outer layer to be connected, wherein the paper web is impregnated with an artificial liquid resin and is then dried. The paper web itself as raw paper without artificial resin preferably has a surface weight of 15 g/m$^2$ to 100 g/m$^2$. For economical reasons, the paper is preferably uncolored and unprinted since the paper is no longer visible after having been applied to the outer layer. The artificial resin, which is used for impregnating the board, is preferably selected from the group, which includes urea, melamine, phenol-formaldehyde resin or combinations of the aforementioned artificial resins, so-called mixed resins or derivates, are used. For special applications, high-tech resins, such as e.g. epoxy resins, which are however rarely used due to the costs, are also possible.

The artificial resin is dried, but not hardened, after the impregnation of the paper. It is advantageously used in a quantity of 30 g/m$^2$ to 200 g/m$^2$, preferably in a quantity of 30 g/m$^2$ to 120 g/m$^2$, advantageously in a quantity of 50 g/m$^2$ to 100 g/m$^2$.

In order to realize the advantages of the composite board according to the invention, it suffices according to a simple embodiment if the paper is impregnated with artificial resin. An additive, which can however be advantageously added to the paper or the artificial resin, is a substance, which hinders or prevents the catching fire or the burning of the composite board. Such substances are generally known; they are often monoammonium phosphate compounds. Since the artificial-resin-impregnated paper is arranged near the surface of the composite board, it can effectively prevent the burning of the composite board. Additives, which are normally added to known artificial-resin-impregnated papers, such as aluminum oxide, are not required for the production of a composite board composed of a wood material with improved strength properties. For economical reasons, they can be readily forgone.

Replacing the use of glue applied in liquid form with an artificial-resin-impregnated paper eliminates disadvantages and brings unexpected advantages: replacing a liquid with a non-liquid, artificial-resin-impregnated paper avoids the unexpected introduction of liquid, in particular water, to the middle layer and the outer layers. The relatively low amount of water released during the hardening of a few glues already leads to an unwanted swelling of the middle or outer layer and thus to the drag-in of tensions into the board with the result of unwanted deformations. Moreover, an uneven application of liquid glue is avoided since the artificial-resin-impregnated paper is also extensively available in a consistently good quality. The artificial-resin-impregnated paper can be provided in extensive paper webs, which correspond with the format of the middle layer and the outer layers.

It is considered advantageous that a pressed-material stack made of at least one outer layer and one middle layer as well as an artificial-resin-impregnated paper arranged between outer layer and middle layer can be pressed to form a composite board in a conventional short-cycle press. Short-cycle presses are conventional manufacturing equipment for the production of laminated products or composite boards. The use of complex gluing devices is forgone. A pressed-material stack is preferably pressed to form a composite board, which—as seen from the bottom side of the pressed-material stack—consists of a bottom outer layer, a bottom artificial-resin-impregnated paper, a middle layer, a top artificial-resin-impregnated paper and a top outer layer.

The composite board composed of wood material according to the invention has considerably improved strength properties compared to known composite boards composed of wood material. Compared to known composite boards composed of wood material, the composite board according to the invention has respectively approximately 50% more transverse tensile strength, bending strength and face strength. This extraordinary increase in strength can be attributed to the fact that, in the edge area of the composite board particularly loaded by exerted forces, which extends from the outside of the outer layer up to the surface of the middle layer, exerted forces no longer need to be absorbed alone by the outer layer and a glued joint. It is rather shown than the artificial-resin-impregnated paper contributes considerably to the strength improvement of the composite board according to the invention, both due to the artificial resin, which is particularly well anchored on the surfaces of the outer layer and the middle layer and has a high inherent strength, but also due to the paper, which is also to be seen as a reinforcing armor made of fibers in the composite board according to the invention. The artificial-resin-impregnated paper, which is arranged in the edge area of the composite board according to the invention, acts approximately like a tension rod.

It is known indeed from DE 103 00 247 B4 (Kronotec AG) to coat a chipboard using an artificial-resin-impregnated paper with a genuine-wood veneer. However, in this connection a dyed paper was used in order to ensure a visually attractive surface of the board provided with genuine-wood veneer. The strength properties of the board described in DE 103 00 247 B4 are not tested. Information on the impact of an artificial-resin-impregnated paper on the strength development of a composite board cannot be found.

DE 103 00 247 B4 thus does not relate to the subject matter of the present invention because the present invention relates to a composite board composed of wood material, in which the outer layer also consists of wood material, and wherein this composite board is optimized to reach high strengths. The composite board according to the invention can be used as a construction board e.g. in furniture construction, in interior work, in stage construction and for comparable uses. If there is a need to use a composite board composed of wood material with a decorative surface, the outside of the composite board according to the invention must be provided with a further coating.

Since the artificial-resin-impregnated paper is an economically available product, which is available in a consistent quality, and since existing production facilities (short-cycle press) can be used, the composite board according to the invention can be produced economically.

The connection between the middle layer and the at least one outer layer is preferably established in that an artificial-resin impregnated paper is arranged between the at least one outer layer and the middle layer. In particular, it is advantageous to connect a pressed-material stack to form a composite board composed of wood material according to the invention, which is made up of a bottom outer layer, a bottom artificial-resin-impregnated paper, a middle layer, a top artificial-resin-impregnated paper and a top out layer. The pressed-material stack is assembled e.g. with conventional tools (stacking devices, trays, clamps) and immobilized and placed in the short-cycle press. There, the pressed-material stack is pressed between heated pressing plates. During the pressing process, the artificial resin liquefies and then hardens.

Mechanical as well as presumed chemical bonds with the surface of the outer layer and the middle layer are thereby created so that the outer layer and the middle layer are interconnected permanently. The paper is not damaged by the liquification and hardening of the artificial resin. It remains embedded in the hardened artificial-resin layer and receives in particular tensile loads, which act on the edge area of the composite board according to the invention.

The composite board composed of wood material according to the invention has extraordinarily good strength properties, in particular because, in the edge area of the composite board, not only the artificial-resin-impregnated paper contributes to a large degree to the strength of the composite board. An outer layer made of fiberboard material also contributes to a large degree to the high strength values, which are measured for the composite board according to the invention.

The outer layer of the composite board according to the invention is made of fiberboards and selected with the maximum strength in mind. Fiberboards have no decorative surface. According to a preferred further development of the invention, the outward-facing surfaces of the outer layer can thus be provided with a further single- or multi-layer coating. The coating of the outward-facing surface of an outer layer can take place for example through at least one layer of paint, lacquer, HPL (high pressure laminate), veneer or through a combination of these coatings, for example veneer and lacquer.

Other materials, which can be applied individually or in combination to the outer layer of a composite board according to the invention, are e.g. paper and cardboard, in particular wallpaper, film, textiles such as fabric or felt, vinyl, leather, cork, stone surfaces, metals or respectively metal foils, plastic coatings made of polypropylene, polyethylene or polyvinyl acetate, ceramic coatings like tiles or ceramic artificial-resin mixtures, glass, writable films (board film), magnetic coatings, radiation-resistant, e.g. lead-containing foils or plates, mineral fabric, roving or fleece such as e.g. basalt fabric, which can receive forces. Fibers or fiber mixtures can also be applied as coatings to the outer layer of a composite board according to the invention, e.g. organic fibers like cellulose fibers, synthetic fibers like plastic fibers, or inorganic fibers like metal or ceramic fibers.

Depending on the design, the aforementioned coating means can be used for aesthetic purposes, e.g. cloth or wallpaper. But they can also help to improve it technically, such as e.g. coatings, which magnetize the surface, which act in a radiation-resistant manner or which further improve the strength properties.

A combination of the aforementioned materials is also possible, as well as in the manner that the materials are applied on top of each other, e.g. a radiation-resistant foil or plate is first applied to the board, which is then coated with a decorative film made of plastic or metal. But it is also possible to coat the outer layer of the composite board according to the invention with different materials in sections next to each other, e.g. to glue leather and cork next to each other, in order to achieve a certain aesthetic effect.

From the combination of a high-strength composite board with the simple coatability for further improvement of the technical and aesthetic properties of the board, it results that the composite board according to the invention can be used in particular for challenging applications, e.g. in laboratories and doctor's offices.

Details of the invention will be explained in greater detail below based on an exemplary embodiment.

BRIEF DESCRIPTION OF THE DRAWINGS

FIG. 1 shows a schematic representation of the structure of a preferred embodiment of the composite board composed of wood material according to the invention.

DETAILED DESCRIPTION

FIG. 1 shows in a schematic representation the layers of a preferred embodiment of the composite board 1 composed of wood material according to the invention with a bottom outer layer 2, a bottom artificial-resin-impregnated paper 3, a middle layer 4, a top artificial-resin-impregnated paper 5 and a top outer layer 6 using the example of a pressed-material stack 10. The bottom and the top outer layer consist in the exemplary embodiment shown in FIG. 1 of 2.9-mm-thick HDF fiberboard.

However, regardless of the exemplary embodiment, it should be noted that the material and thickness of the outer layers can be selected independently of each other. The bottom and the top outer layers can thus have different thicknesses. They can also be made of different materials.

In the present exemplary embodiment, the middle layer 4 is made of a 13-mm-thick chipboard. A bottom or respectively top artificial-resin-impregnated paper 3, 5 is arranged between each of the bottom and top outer layers 2, 6 and the middle layer 4. The artificial-resin-impregnated paper is made of a raw paper with a weight of 27 gsm before the impregnation with artificial resin. After the impregnation with artificial resin, here urea melamine, the surface weight of the paper is 125 gsm. During the pressing with the outer layers 2, 6, the paper has a moisture content of 7%. This moisture content approximately corresponds with the residual moisture content of the outer layers 2, 6 and the middle layer 4 so that no additional moisture is introduced to the wood material boards of the outer layers 2, 6 and the middle layer 4 during the pressing.

The pressed-material stack 10 shown in FIG. 1 is pressed for 300 seconds in a short-cycle press, the pressing plates of which are heated to 150° Celsius. In this time, the artificial resin melts and hardens. At the end of the pressing process, a composite board composed of wood material with a board thickness of a total of approximately 19 mm and an average bulk density according to EN 323 of 809 kg/m³ is created, for which the following strength values were measured:

Transverse tensile strength (measured as per EN 319): 0.75 N/mm²

Bending strength (measured as per EN 310): 36 N/mm²

Peel strength (measured as per EN 311): 1.26 N/mm²

The strength values of the composite board composed of wood material according to the invention that improved predominantly more than approximately 50% are potentially mainly attributable to improvements in the edge area 7 of the composite board, the edge area being composed of the artificial-resin-impregnated paper and an outer layer; formulated differently, the edge area thus extends from the surface 8 of the middle layer 4 up to the outside 9 of an outer layer.

In the case of the composite board 1 according to the invention, on the one hand the used artificial resin has very good strength properties, because it is also very well anchored mechanically on the surface of the outer layer and the middle layer through the pressing in the short-cycle press. On the other hand, the paper embedded in the artificial resin is also unlimitedly intact after the pressing of the pressing-material stack, and the fiber mesh of the paper web is an additional component of the composite board 1 according to the invention, which is suitable for receiving tensile forces.

In the edge area 7 of the composite board according to the invention, tensile forces occur respectively in the tensile-loaded edge area of the composite board 1 in the case of compressive or tensile forces acting from the outside. The receipt of these tensile forces was previously limited by the strength of the glued joint between the middle layer and an outer layer of the known composite boards composed of wood material. In the case of the composite board 1 according to the invention, it is not only the artificial resin that is able to receive high tensile forces. In particular, the fibers of the paper are also able to receive high tensile forces. The bottom and the top artificial-resin-impregnated paper 3, 5 act inasmuch as a tension rod, which is attached in the edge area 7 of the composite board 1.

Regardless of the present exemplary embodiment, it should be noted that the artificial-resin-impregnated paper has the advantage compared to the previously known and conventional glue application on the outer layer and/or middle layer that the artificial-resin-impregnated paper can better counterbalance unevennesses in the surfaces of the outer layer and middle layer so that weak points in the connection of the outer layer and the middle layer are mainly excluded and that composite boards are provided, which have a good dimensional stability and even outsides.

A first outer layer of a composite board is glued with rectangular sections made of leather and copper foil in order to form an aesthetic surface. For this purpose, the other materials as mentioned before in the description can also be used. A second outer layer of a composite board is glued with a radiation-resistant metal foil composed of lead, onto which an HPL laminate is then laminated. A technically improved and easy-to-clean surface is created.

The invention claimed is:

1. A composite board composed of wood material with a middle layer (4) made of chipboard, wherein the middle layer is connected to at least one outer layer (2, 6) composed of fiberboard, wherein an artificial-resin-impregnated paper (3, 5) is arranged between the middle layer and the outer layer.

2. The composite board according to claim 1, wherein an artificial-resin-impregnated paper (3, 5) is used, wherein the weight of the paper is 15 g/m² to 100 g/m².

3. The composite board according to claim 1, wherein the artificial-resin-impregnated paper (3, 5) comprises artificial resin in a quantity of 30 g/m² to 200 g/m².

4. The composite board according to claim 1, wherein the artificial-resin-impregnated paper (3, 5) is impregnated with one or more of the artificial resins from the group, which includes urea, melamine, formaldehyde, phenol resin, epoxy resin as well as their mixtures and derivates.

5. The composite board according to claim 1, wherein the artificial-resin-impregnated paper (3, 5) comprises an additive, which hinders or prevents a catching fire or a burning of the composite board (1).

6. The composite board according to claim 1, wherein the middle layer (4) is provided with an outer layer (2, 6) on both sides.

7. The composite board according to claim 1, wherein the outer layer (2, 6) comprises a board made of high-density or medium-density fiberboard.

8. The composite board according to claim 1, wherein the outer layer (2, 6) has a board thickness of 1 mm to 5 mm.

9. The composite board according to claim 1, wherein a further coating is applied to the outside (9) of at least one outer layer (2, 6) of the composite board (1).

10. The composite board according to claim 9, wherein a coating is applied to the outside (9) of at least one outer layer (2, 6) as a further coating from the group, which comprises individually or in combination: paint, lacquer, HPL or veneer, paper, cardboard, wallpaper, film, textiles, fabric, felt, vinyl, leather, cork, stone surfaces, metals, metal foils, plastic coatings, polypropylene, polyethylene or polyvinyl acetate coatings, ceramic coatings, tiles, ceramic artificial resin mixtures, glass, writable films, magnetic coatings, radiation-resistant foils or plates, mineral fabric, organic, inorganic and synthetic fibers.

11. A method for producing a composite board composed of wood material with a middle layer (4) composed of chipboard, wherein the middle layer is connected to at least one outer layer (2, 6) composed of fiberboard, characterized in that an artificial-resin-impregnated paper (3, 5) is arranged between the middle layer and the outer layer with the steps:

assembly of a pressing-material stack (10) comprising a middle layer (4), an artificial-resin-impregnated paper (3, 5) and at least one outer layer (2, 6), wherein the artificial-resin-impregnated paper is inserted between the middle layer and the outer layer, and pressing of the pressing-material stack (10) to form a composite board (1).

12. The method according to claim 11, wherein the pressing of the pressing-material stack (10) takes place at a high pressure and at a high temperature.

13. The method according to claim 11, wherein the pressing of the pressing-material stack (10) to form a composite board (1) takes places through the softening of the artificial resin, with which the paper is impregnated, and the subsequent hardening of the artificial resin.

14. The composite board according to claim 1, wherein the outer layer (2,6) has a board thickness of 1 mm to 2.5 mm.

* * * * *